(12) United States Patent
Zhang

(10) Patent No.: US 7,963,045 B2
(45) Date of Patent: Jun. 21, 2011

(54) DETECTION DEVICE FOR DETECTING DISTANCE BETWEEN CENTERS OF TWO THROUGH HOLES

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/490,343

(22) Filed: Jun. 24, 2009

(65) Prior Publication Data

US 2010/0293803 A1 Nov. 25, 2010

(30) Foreign Application Priority Data

May 25, 2009 (CN) .......................... 2009 1 0302599

(51) Int. Cl.
*G01B 3/30* (2006.01)
*G01B 3/46* (2006.01)
*G01B 5/14* (2006.01)

(52) U.S. Cl. ...................... 33/501.06; 33/501.45; 33/520

(58) Field of Classification Search ............... 33/501.06, 33/501.05, 501.08, 501.09, 501.45, 501.6, 33/520, 613, 644, 671

See application file for complete search history.

(56) References Cited

U.S. PATENT DOCUMENTS

| | | | | |
|---|---|---|---|---|
| 2,693,033 A * | 11/1954 | Acker, Jr. et al. | ............... | 33/520 |
| 4,202,106 A * | 5/1980 | Olson | ............... | 33/520 |
| 4,327,493 A * | 5/1982 | Dickerson | ............... | 33/520 |
| 4,731,931 A * | 3/1988 | Goodman et al. | ............... | 33/796 |
| 4,805,316 A * | 2/1989 | Curti | ............... | 33/613 |
| 5,339,536 A * | 8/1994 | Buttars | ............... | 33/613 |
| 6,029,362 A * | 2/2000 | Miodragovic | ............... | 33/666 |
| 6,141,885 A * | 11/2000 | Ishitani et al. | ............... | 33/645 |
| 6,151,792 A * | 11/2000 | Ohlig et al. | ............... | 33/613 |
| 6,378,192 B1 * | 4/2002 | Ohmi et al. | ............... | 29/464 |
| 6,389,708 B1 * | 5/2002 | Christensen | ............... | 33/645 |
| 6,421,928 B1 * | 7/2002 | Miller | ............... | 33/520 |
| 2002/0095812 A1 * | 7/2002 | Newman | ............... | 33/613 |

* cited by examiner

*Primary Examiner* — Christopher W Fulton
(74) *Attorney, Agent, or Firm* — Raymond J. Chew

(57) ABSTRACT

A detection device for detecting a distance between centers of two through holes includes a support member, a base member, and a measurement member. The base member and the measurement member are set on opposite ends of the support member. The base member is operable to enter one of the through holes. A distance between a center of the base member and a center of the measurement member is equal to a normal distance between centers of the two through holes. If an actual distance between the centers of the two through holes meets a determined specification, the measurement member will enter the other through hole. If the actual distance between the centers of the two through holes does not meet the determined specification, the measurement member cannot enter the other through hole.

11 Claims, 6 Drawing Sheets

DETECTION DEVICE FOR DETECTING DISTANCE BETWEEN CENTERS OF TWO THROUGH HOLES

BACKGROUND

1. Technical Field

The present disclosure relates to detection devices, and particularly to a detection device for detecting a distance between centers of two through holes.

2. Description of Related Art

In device machining, a punching mode is frequently used. Often, the devices define a lot of through holes. To ensure a distance between adjacent through holes meets determined specifications, a caliper is generally used for detecting the distance. However, due to the complicated operation of the caliper and human errors, detection precision is reduced.

DETAILED DESCRIPTION

Figure 1:
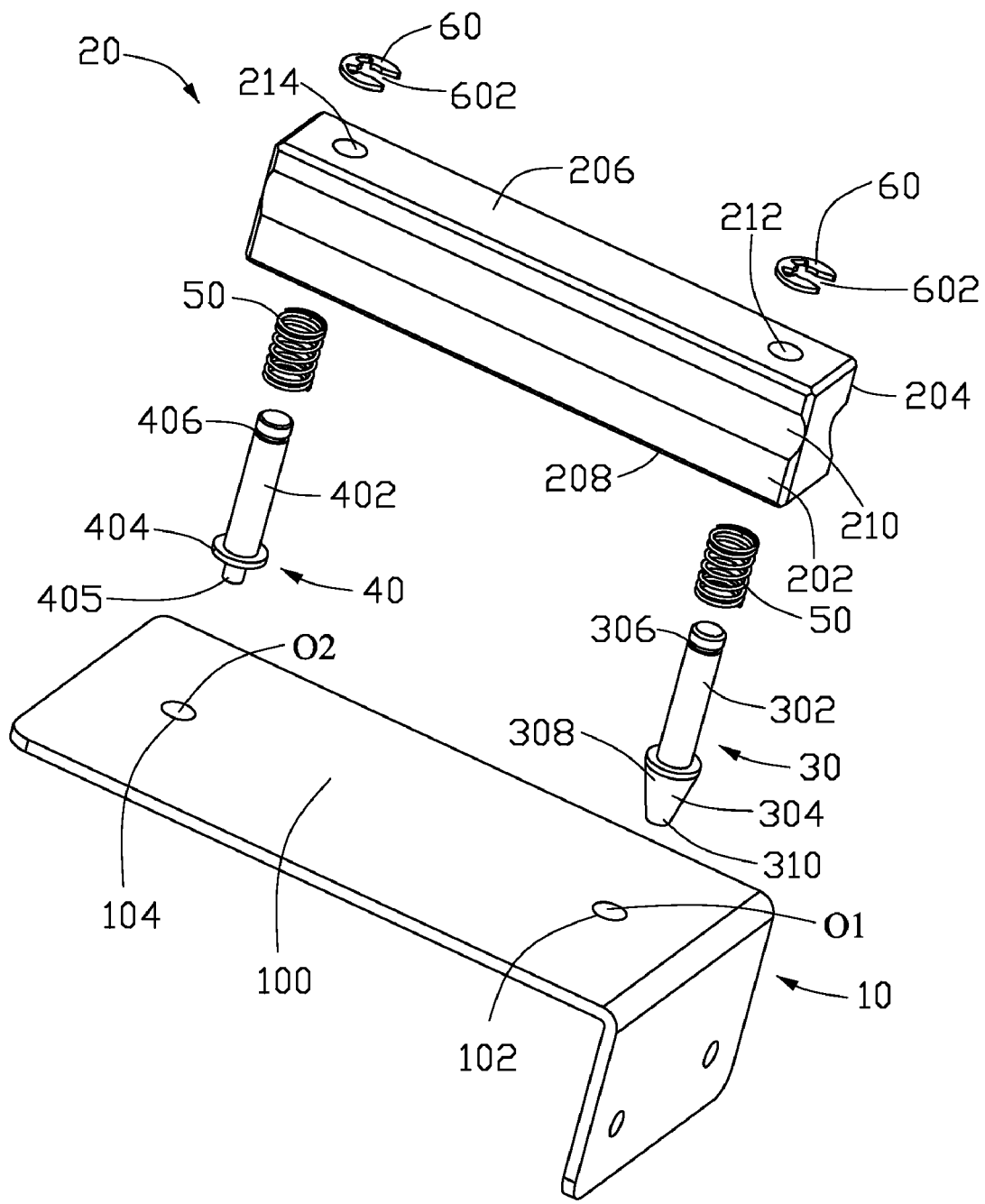
FIG. 1 is an exploded, isometric view of an exemplary embodiment of a detection device, together with an article.
Figure 2:
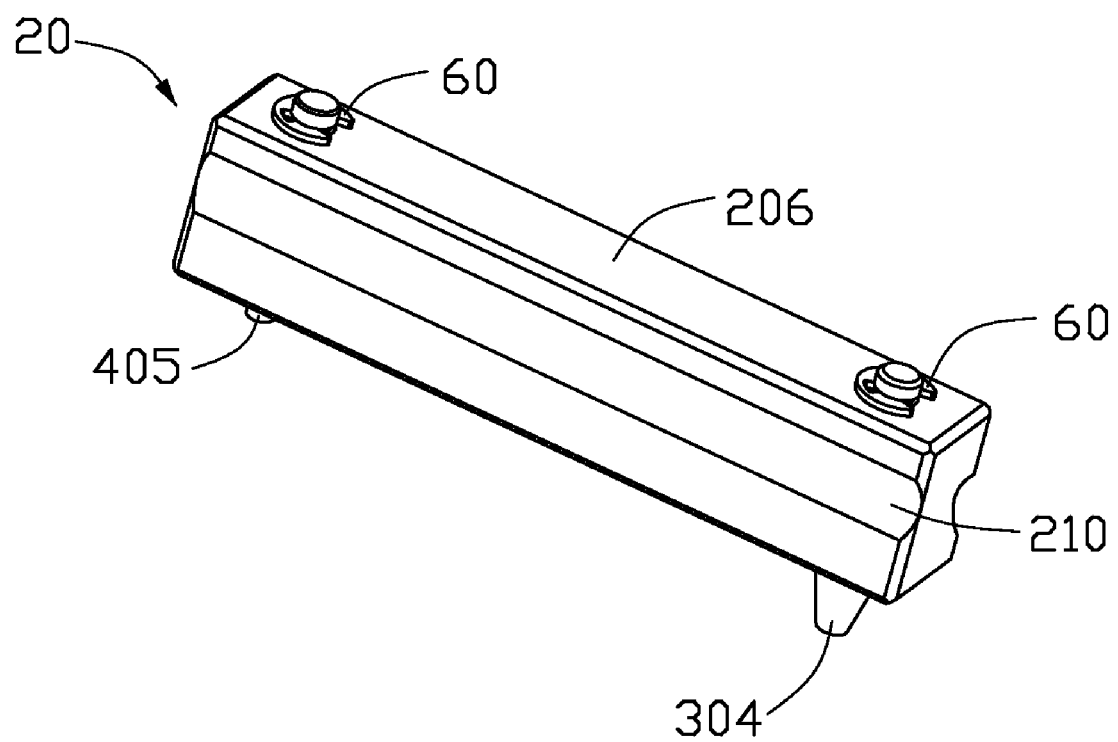
FIG. 2 is an assembled, isometric view of the detection device of FIG. 1.
Figure 3:
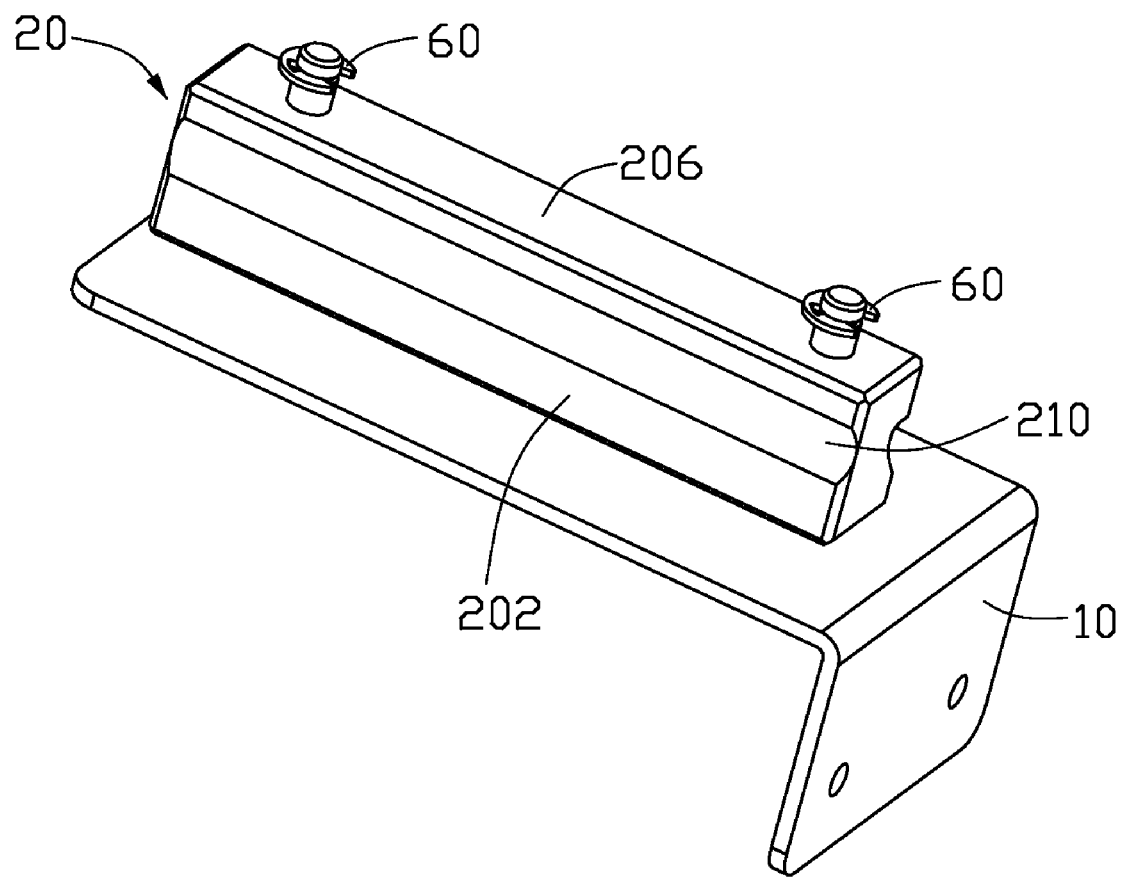
FIG. 3 is an assembled, isometric view of the detection device and the article of FIG. 1.
Figure 4:
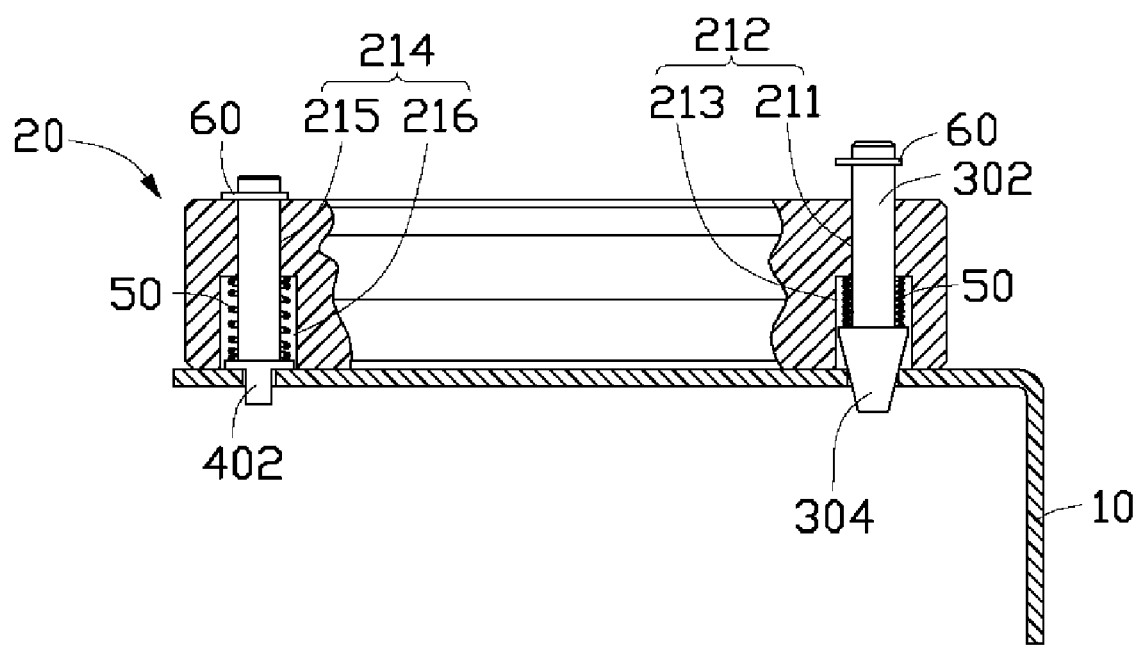
FIGS. 4 to 6 are sectional views of three detection states of FIG. 3.
Figure 5:
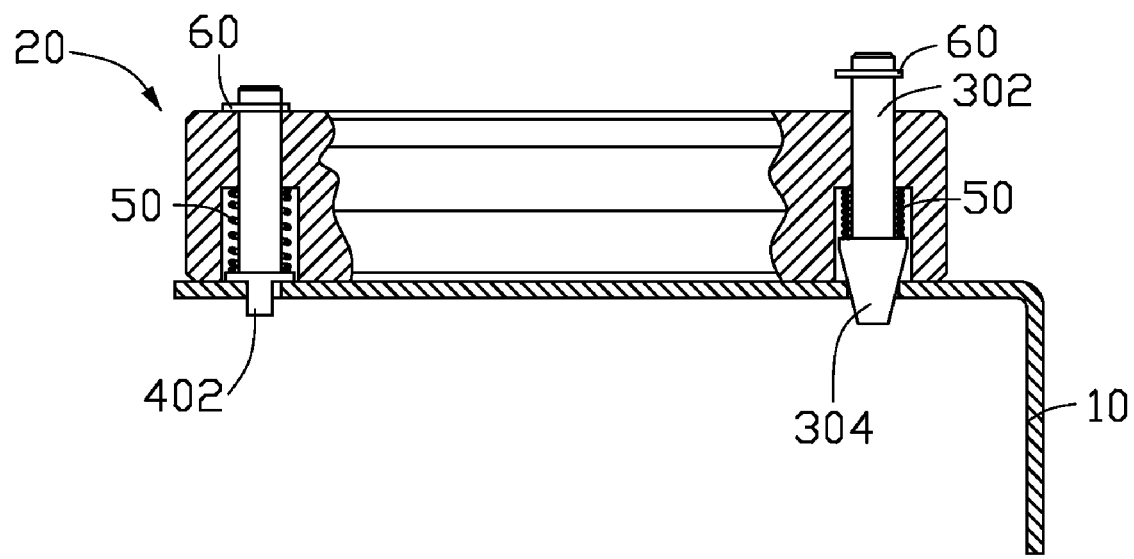
Figure 6:
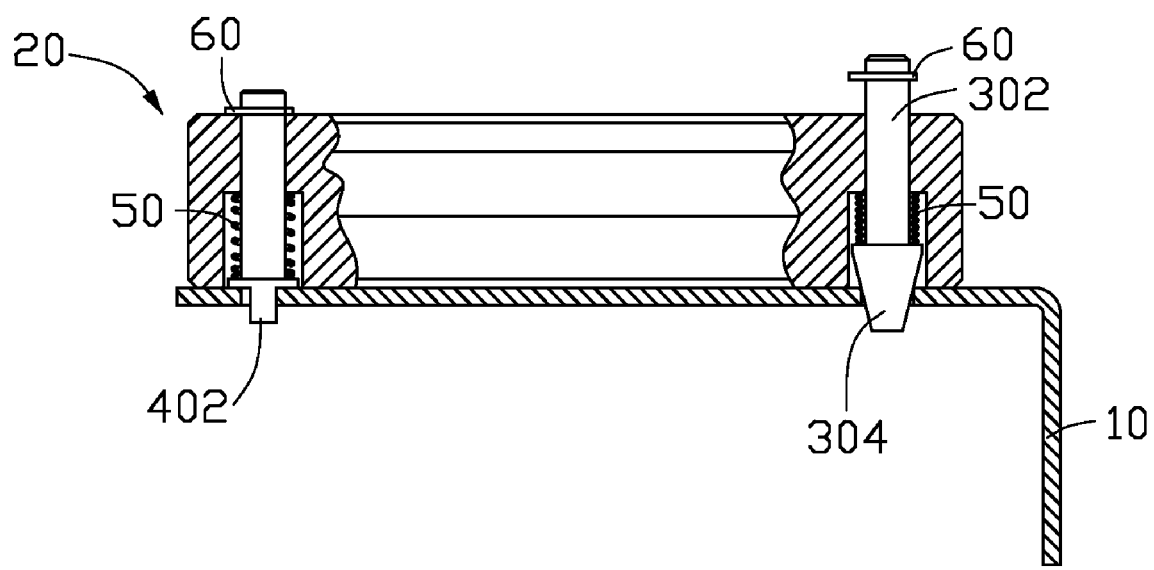

Referring to FIGS. 1 and 4, an exemplary embodiment of a detection device detects whether a distance between a center O1 of a first through hole 102 and a center O2 of a second through hole 104 defined in a panel 100 of an article 10 meets determined specifications. The detection device includes a support member 20, a base member 30, a measurement member 40, two elastic elements, such as two helical springs 50, and two fixing members 60. In this embodiment, the article 10 may be a computer part.

The support member 20 is generally rectangular-shaped, and includes opposite side surfaces 202, 204, a top surface 206, and a bottom surface 208 opposite to the top surface 206. Each of the side surfaces 202, 204 defines an arc-shaped slot 210, for easily gripping the support member 20. Two stepped holes 212, 214 are defined in opposite ends of the support member 20 and extend through to the top surface 206 and the bottom surface 208. The stepped hole 212 includes a smaller hole 211 adjacent to the top surface 206 and a larger hole 213 adjacent to the bottom surface 208, and the stepped hole 214 includes a smaller hole 215 adjacent to the top surface 206 and a larger hole 216 adjacent to the bottom surface 208.

The base member 30 includes a cylinder-shaped main body 302, and a taper-shaped positioning portion 304 extending from a first end of the main body 302. An annular groove 306 is defined in a circumference of the main body 302, adjacent to a second end opposite to the first end of the main body 302. A diameter of the main body 302 is substantially equal to a diameter of the smaller hole 211 of the stepped hole 212. A diameter of a great end 308 adjacent to the main body 302 of the positioning portion 304 is greater than a diameter of the first through hole 102 of the article 10, but less than a diameter of the larger hole 213 of the stepped hole 212. A diameter of a tip end 310 opposite to the great end 308 of the positioning portion 304 is less than the diameter of the first through hole 102, thereby the positioning portion 304 can be partly received in the first through hole 102. If the diameter of the first through hole 102 is greater than a diameter of the second through hole 104, the diameter of the tip end 310 can be set to be less than the diameter of the first through hole 102 while greater than the diameter of the second through hole 104, therefore the tip end 310 can only be partly received in the first through hole 102 rather than the second through hole 104. In other embodiments, the main body 302 and the positioning portion 304 of the base member 30 can be other shapes.

The measurement member 40 includes a cylinder-shaped main body 402, a cylinder-shaped extending body 405 extending from a first end of the main body 402, and an annular securing portion 404 protruding around the first end of the main body 402. A diameter of the securing portion 404 is less than a diameter of the larger hole 216 of the stepped hole 214. A diameter of the main body 402 is substantially equal to the diameter of the smaller hole 215 of the stepped hole 214. A diameter of the extending body 405 is less than the diameter of the main body 402, and less than the diameter of the second through hole 104. An annular groove 406 is defined in a circumference of a second end opposite to the first end of the main body 402. In other embodiments, the main body 402 of the measurement member 40 can be other shapes, such as rectangle or taper. A distance between an axis of the extending body 405 and the center of the tip end 310 is set to be equal to a normal distance between the center O1 of the first through hole 102 and the center O2 of the second through hole 104. For example, if the diameter "d" of the first through hole 102 is 4 millimeters, the diameter "D" of the second through hole 104 is 6 millimeters, the normal distance "L" between the center O1 of the first through hole 102 and the center O2 of the second through hole 104 is 72 millimeters, and a permissible error "e" is 0.5 millimeters, the diameter "x" of the extending body 405 can be deduced by a formula of x=d−2*e=4−2*0.5=3 millimeters, indicating that the distance between the center O1 of the first through hole 102 and the center O2 of the second through hole 104 meets a determined specification that the distance is within the range of 72±0.5 millimeters. In other embodiments, the base member 30 and the measurement member 40 can also be integrally formed on the support member 20.

Each fixing member 60 is circular-shaped, and defines an Ω-shaped opening 602 for fitting hold one of the main bodies 302, 402 and accommodating in one of the grooves 306, 406 correspondingly.

In assembly, one spring 50 fits about the main body 302 of the base member 30 and resists against the positioning portion 304 with a first end of the spring 50. The main body 302 of the base member 30 passes through the stepped hole 212 from the bottom surface 208 of the support member 20, with the second end of the main body 302 extending out from the top surface 206. A corresponding fixing member 60 resists against the top surface 206 of the supporting member 20 and is engaged in the groove 306 of the base member 30, to mount the base member 30 to the support member 20. The spring 50 drives the base member 30 to slide in a direction perpendicular to the support member 20, thereby allowing the great end 308 of the positioning portion 304 to partly extend out from the bottom surface 208 of the support member 20. The other spring 50 fits about the main body 402 of the measurement member 40 and resists against the securing portion 404 with a first end of the spring 50. The main body 402 of the measurement member 40 passes through the stepped hole 214 from the bottom surface 208 of the support member 20, with the second end of the main body 402 extending out from the top surface 206. The other fixing member 60 resists against the top surface 206 of the supporting member 20 and is engaged in the groove 406 of the measurement member 40, to mount the measurement member 40 to the support member 20. The other spring 50 drives the measurement member 40 to slide in a direction perpendicular to the support member 20, thereby allowing a part of the securing portion 404 and the extending body 405 to extend out from the bottom surface 208 of the support member 20.

Referring to FIGS. 3 to 6, in use, the positioning portion 304 of the base member 30 is inserted into the first through hole 102 of the article 10, and the measurement member 40 together with the support member 20 is rotated around the positioning portion 304, with a bottom of the extending body 405 slidable on a top surface of the panel 100. If the distance between the center O1 of the first through hole 102 and the center O2 of the second through hole 104 meets the determined specification, the corresponding spring 50 restores to drive the extending portion 405 to enter the second through hole 104, once the extending portion 405 aligns with the second through hole 104. However, when the distance between the center O1 of the first through hole 102 and the center O2 of the second through hole 104 does not meet the determined specification, the extending portion 405 cannot enter the second through hole 104. For example, the normal distance L between the center O1 of the first through hole 102 and the center O2 of the second through hole 104 is 72 millimeters, the permissible error "e" is 0.5 millimeters, the distances between the center O1 of the first through hole 102 and the center O2 of the second through hole 104 can be 72 millimeters (shown in FIG. 5), 72−0.5 millimeters (shown in FIG. 4), or 72+0.5 millimeters (shown in FIG. 6), in the above three cases, the extending portion 405 can enter the second through hole 104, indicating that the distances between the center O1 of the first through hole 102 and the center O2 of the second through hole 104 in the three cases meet the determined specification.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A detection device for detecting whether a distance between centers of a first and a second through holes defined in a panel of an article meets determined specifications, the device comprising:
   a support member;
   a base member set on a first end of the support member, to enter the first through hole; and
   a measurement member set on a second end opposite to the first end of the support member, wherein a distance between a center of the base member and a center of the measurement member is substantially equal to a normal distance between centers of the first and second through holes, wherein the measurement member can enter the second through hole in response to an actual distance between the first and second through holes substantially equal to the normal distance; the measurement member cannot enter the second through hole in response to the actual distance between the first and second through holes being unequal to the normal distance;
   wherein two holes are defined in the support member, the base member and the measurement member respectively extend through the holes and slide in a direction perpendicular to the support member;
   wherein the measurement member comprises a main body, an extending body extending from a first end of the main body, and a securing portion formed around the first end of the main body, a groove is defined in a circumference of a second end opposite to the first end of the main body to engage with a fixing member, to prevent the measurement member from disengaging from the support member;
   the main body of the measurement member is cylinder-shaped, a diameter of the extending body of the measurement member is substantially equal to a diameter of the second through hole minus twice of a permissible error.

2. The device of claim 1, wherein the support member comprises a top surface and a bottom surface, the two holes are defined in the first and second opposite ends of the support member to extend through the top and bottom surfaces.

3. The device of claim 2, wherein each of the holes is stepped, and comprises a smaller hole adjacent to the top surface and a larger hole adjacent to the bottom surface, wherein the larger hole can receive an elastic member mounted to the corresponding one of the base member and the measurement member.

4. The device of claim 3, wherein the base member comprises a main body passing through the corresponding hole of the support member and a positioning portion extending from a first end of the main body, wherein the positioning portion is operable to be partly received in the first through hole, a groove is defined in a circumference of a second end opposite to the first end of the main body to engage with a fixing member, to prevent the base member from disengaging from the support member.

5. The device of claim 4, wherein the fixing member defines an Ω-shaped opening to engage with the groove of the base member.

6. The device of claim 4, wherein the base member is cylinder-shaped.

7. The device of claim 4, wherein the positioning portion is taper-shaped.

8. The device of claim 4, wherein the elastic member mounted to the base member is a spring fitting about the main body of the base member and resisting against the positioning portion with an end of the spring.

9. The device of claim 2, wherein the support member further comprises opposite side surfaces each defining a slot.

10. The device of claim 1, wherein the fixing member defines an Ω-shaped opening, to engage with the groove of the measurement member.

11. The device of claim 1, wherein a spring fits about the main body of the measurement member and resists against the securing portion with an end of the spring.

* * * * *